United States Patent [19]

Roberts

[11] 4,305,833

[45] Dec. 15, 1981

[54] LUBRICATING OILS CONTAINING ACETOACETANILIDES AS ANTIOXIDANTS

[75] Inventor: John T. Roberts, Des Plaines, Ill.

[73] Assignee: UOP Inc., Des Plaines, Ill.

[21] Appl. No.: 171,862

[22] Filed: Jul. 24, 1980

[51] Int. Cl.$^3$ .............................................. C10M 1/32
[52] U.S. Cl. ................................. 252/51.5 A; 252/403
[58] Field of Search ........................... 252/51.5 A, 403

[56] References Cited

U.S. PATENT DOCUMENTS

| | | | |
|---|---|---|---|
| 1,789,302 | 1/1931 | Calcott et al. | 252/51.5 AX |
| 2,654,722 | 10/1953 | Young et al. | 252/51.5 A |
| 3,039,861 | 6/1962 | Andress, Jr. et al. | 252/403 X |
| 3,183,069 | 5/1965 | Udelhofen | 252/51.5 A X |
| 3,214,377 | 10/1965 | Hotten | 252/51.5 A X |
| 3,280,033 | 10/1966 | Drummond | 252/51.5 A |
| 3,953,346 | 4/1976 | Thompson | 252/51.5 A |

*Primary Examiner*—Andrew Metz
*Attorney, Agent, or Firm*—James R. Hoatson, Jr.; Eugene I. Synder; William H. Page, II

[57] ABSTRACT

Acetoacetanilides and related beta-ketoacetanilides are effective antioxidants when used as additives in petroleum products and petroleum-related products. Antioxidant properties are displayed at levels as low as about 0.05 weight percent.

11 Claims, No Drawings

LUBRICATING OILS CONTAINING ACETOACETANILIDES AS ANTIOXIDANTS

BACKGROUND OF THE INVENTION

A persistent problem common to virtually all petroleum products and petroleum-related products is their tendency to undergo oxidative degradation. Oxidation may occur even under the relatively mild conditions attending storage and transport, and is appreciably accelerated when operating conditions are conducive to oxidative processes, for example the elevated temperatures experienced by lubricating oils. Such oxidative processes not only cause chemical degradation of the petroleum or petroleum-related product, but may also cause appreciable changes in desirable physical properties, such as viscosity, which lead to a deterioration in performance of the product. Additionally, the oxidative products themselves may attack materials in contact with petroleum and petroleum-related products, such as metals in contact with transmission or lubricating oils, thereby inducing inefficient performance and, in some cases, even structural failure.

It has now been found that acetoacetanilides and other beta-ketoanilides are effective antioxidants in the aforementioned products. In some cases these materials display antioxidant properties exceeding those of available antioxidants, thereby permitting their effective use at relatively lower levels. The antioxidants described herein possess the further advantage that structural changes within broad, but nonetheless well defined, limits are possible, thereby permitting optimization of the antioxidant for a particular product in a specified use.

SUMMARY OF THE INVENTION

A principle object is to provide a method of inhibiting or retarding the oxidation of petroleum products and petroleum-related products by adding thereto additives displaying antioxidant properties at concentrations as low as about 0.05 wt.%. Another object of this invention is to provide compositions of petroleum products and petroleum-related products containing minor amounts of additives which display increased resistance to oxidation. In one embodiment said additives are acetoacetanilides and related beta-ketoacetanilides. In a more specific embodiment the additive is para-methoxyacetoacetanilide.

DESCRIPTION OF THE INVENTION

The materials used in this invention are acetoacetanilides, nuclear substituted acetoacetonilides, and related beta-ketoacetanilides. The discovery of this invention is that materials have of such structure possess potent antioxidant properties and can be effectively used as an additive to retard or inhibit oxidation in petroleum products and petroleum-related products at concentrations as low as about 0.05 wt.%. The additives of this application have a common structure represented by the formula,

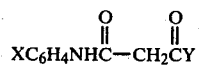

$$XC_6H_4NHC-CH_2CY$$ (with two C=O groups)

X is selected from the group consisting of hydrogen, halogens, especially chlorine, nitro, cyano, carboxyl, hydroxyl, alkyl, phenoxy, alkoxyl and alkylmercapto, where the carbonaceous portion of the latter groups contain up to about 18 carbon atoms, are saturated, and may be either straight or branched chain. Examples include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl groups. It has been found that where the carbonaceous portion consists of a branched chain, the materials exhibit a greater solubility in petroleum products and petroleum-related products, which is often highly advantageous. For this reason such branched chain materials are somewhat are somewhat preferred.

The moiety, Y, of the above structure may be an alkyl or an alkoxyl group whose carbonaceous portion contains up to about ten carbon atoms. The carbonaceous portion is saturated and may consist of either a straight or a branched chain. Materials having a branched chain are somewhat preferred because of their increased solubility, as described above. Examples of suitable groups include methyl, ethyl, propyl, butyl, pentyl, hexyl, heptyl, octyl, nonyl, and decyl.

Specific examples of materials which may be used in this invention, cited solely for illustrative purposes, include acetoacetanilide, ortho-, meta-, and para-acetoacetaniside, ethoxyacetoacetanilide, choroacetoacetanilide, bromoacetoacetanilide, fluoroacetoacetanilide, nitroacetoacetanilide, acetoacetoluidide, ethylacetoacetanilide, butylacetoacetanilide, phenoxyacetoacetanilide, nonyloxyacetoacetanilide, cyanoacetoacetanilide, methylmercaptoacetoacetanilide, hexylmercaptoacetoacetanilide, propionoacetanilide, butyroacetanilide, and the methyl, ethyl, butyl, pentyl, etc., esters of 2-keto-4-phenylaminobutyric acid.

The materials described herein may be used as antioxidants in a wide variety of petroleum and petroleum-related products, and similar synthetic products. For example, the materials may be used in lubricating oils and greases, either of synthetic or petroleum origin. Examples, cited for illustrative purposes only, include aliphatic esters, polyalkylene oxides, silicones, phosphoric and silicic acids, fluorine-substituted hydrocarbons, and the like. Lubricating oils of petroleum origin include motor lubricating oil, railroad type lubricating oil, marine oil, transformer oil, transmission oil, turbine oil, gear oil, differential oil, diesel lubricating oil, hydraulic oil, cutting oil, rolling oil, etc. Greases included petroleum grease, whale grease, wool grease, grease from inedible fats and oils, synthetic greases, such as those from mineral or synthetic oils containing hydrocarbonsoluble metal salts of higher fatty acids, and so forth. The materials of this invention also are suitable for stabilization of plastics and rubbers obtained from polymerization of various petroleum-derived materials, such as polyethylene, polypropylene, polybutadiene, polystyrene, copolymers of ethylene and butadiene, and the like, polyacrylonitrile, polyacrylates, and so forth.

The materials described herein when used as antioxidants may be effective at concentrations as low as 0.05 weight percent. Higher concentrations of additives may be used, although economic considerations dictate their usage at as low a level as is feasible, and the additives of this invention generally will be used at concentrations less than about 5 weight percent.

The examples given herein are merely illustrative of this invention and are not to be construed as limiting the invention thereto.

EXAMPLES 1-5

A standardized test was used to screen the suitability of particular compounds as a stable antioxidant. Air at a constant rate of 50 ml. per minute was bubbled through the test oil (a bright stock, Sentry 150 from Citgo) which was held at 275° F. in a thermostatically heated aluminum block. The test oil, to which was added the potential antioxidant, was contained in a large test tube with metal coupons of aluminum, brass, copper, and steel. Heating time for the test was a minimum of five days, but was continued until the oil spot test indicated that the test sample had significantly decomposed. Upon termination of the test the precipitation number (PN), acid number (AN), change in the viscosity expressed as a percentage change ($\Delta V\%$), weight gain and weight loss of the coupons were determined. It has been found that the latter data are most significant for copper coupons, thus only these are reported herein.

The oil spot test consists of placing a drop of oil on a Shell Oil chromatography sheet. The appearance of the brown spot with a distinct perimeter or a spot with material at the center or with a definite ring indicates significant decomposition of the base oil. This was used to determine the length of the test subject to a five-day minimum time.

The results of testing are summarized in the accompanying table.

TABLE

PERFORMANCE OF ADDITIVES AS ANTIOXIDANTS

| Example | Additive[a] | PN[b] | AN[c] | Wt. loss Cu[d] | Wt. gain Cu[e] | $\Delta V \%$[f] |
|---|---|---|---|---|---|---|
| 1 | none | .005 | 4.48 | 19.3 | 11.2 | 31.3 |
| 2 | X = H | .02 | 1.83 | 9.1 | 15.6 | 11.6 |
| 3 | X = p-CH$_3$O | .02 | 0.99 | 12.6 | 6.9 | 8.6 |
| 4 | X = o-CH$_3$O | .04 | 0.91 | 6.7 | 12.1 | 11.1 |
| 5 | X = o-CH$_3$ | .07 | 1.93 | 9.7 | 14.1 | 5.7 |

[a]Additives are at 0.5 weight %; in each case Y = CH$_3$
[b]Preciptitation nimber, ASTM D-91.
[c]Acid number, ASTM D-974
[d]Copper loss in mg.
[e]Weight of residue in mg. deposited on copper coupon
[f]Percent change in kinematic viscosity at 100° F.

The data clearly show that the additives of this invention lead to a substantial decrease in acid number and cause substantially less copper loss when compared to the blank. Of particular importance is that use of the additives herein causes only minor changes in viscosity over the lifetime of the test.

What is claimed is:

1. A composition comprising a major amount of a lubricating oil or grease thereof and a minor antioxidant amount of a beta-ketoacetanilide of the structure

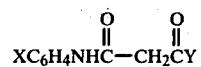

wherein X is selected from the group consisting of hydrogen, halogen, nitro, cyano, carboxyl, hydroxyl, alkyl, alkoxy, and alkylmercapto monieties where the carbonaceous portion contains up to about 18 carton atoms and is saturated, and Y is selected from the group consisting of alkyl and alkoxyl moieties whose carbonaceous portion contains up to about ten carbon atoms and is saturated.

2. The composition of claim 1 wherein said lubricating oils and greases are synthetic or of petroleum origin.

3. The composition of claim 1 wherein said composition comprises a major amount of a lubricating oil.

4. The composition of claim 1 wherein the carbonaceous portion of the group Y is branched.

5. The composition of claim 1 wherein X is hydrogen.

6. The composition of claim 1 wherein Y is methyl.

7. The composition of claim 6 wherein X is methyl or methoxy.

8. A composition comprising a major amount of a lubricating oil or grease thereof and containing a minor antioxidant amount of an acetoacetanilide.

9. The composition of claim 8 wherein said product is a petroleum lubricating oil.

10. The composition of claim 8 wherein said acetoacetanilide is para-methoxyacetoacetanilide.

11. The composition of claim 8 wherein said acetoacetanilide is in an amount of from about 0.05 to about 5% by weight.

* * * * *